(12) United States Patent
Pai

(10) Patent No.: US 8,953,132 B2
(45) Date of Patent: Feb. 10, 2015

(54) PIXEL ARRAY OF FRINGE FIELD SWITCHING LIQUID CRYSTAL DISPLAY PANEL AND DRIVING METHOD THEREOF

(75) Inventor: Cheng-Chiu Pai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 277 days.

(21) Appl. No.: 13/447,309

(22) Filed: Apr. 16, 2012

(65) Prior Publication Data

US 2012/0249496 A1  Oct. 4, 2012

Related U.S. Application Data

(63) Continuation-in-part of application No. 13/172,766, filed on Jun. 29, 2011, now Pat. No. 8,446,552.

(30) Foreign Application Priority Data

Mar. 30, 2011 (TW) .............................. 100110955 A
Dec. 30, 2011 (TW) .............................. 100149957 A

(51) Int. Cl.
*G02F 1/1343* (2006.01)
*G09G 3/36* (2006.01)
*G09G 5/00* (2006.01)
*G02F 1/1362* (2006.01)

(52) U.S. Cl.
CPC ................ *G02F 1/1343* (2013.01); *G09G 3/36* (2013.01); *G09G 5/00* (2013.01); *G09G 3/3655* (2013.01); *G02F 1/136286* (2013.01); *G09G 3/3614* (2013.01); *G09G 2300/0426* (2013.01); *G09G 2310/08* (2013.01); *G09G 2330/021* (2013.01); *G02F 2001/134372* (2013.01)

USPC .......................................................... 349/141

(58) Field of Classification Search
USPC .......................................................... 349/141
See application file for complete search history.

(56) References Cited

U.S. PATENT DOCUMENTS

| 4,842,371 | A  | 6/1989  | Yasuda   |
|-----------|----|---------|----------|
| 6,744,482 | B2 | 6/2004  | Matsumoto|
| 7,068,330 | B2 | 6/2006  | Song     |
| 7,599,032 | B2 | 10/2009 | Chang    |
| 7,817,123 | B2 | 10/2010 | Do       |
| 8,018,399 | B2 | 9/2011  | Liu      |

(Continued)

FOREIGN PATENT DOCUMENTS

| CN | 101101423 A | 1/2008 |
|----|-------------|--------|
| CN | 101458915 A | 6/2009 |

(Continued)

*Primary Examiner* — Timothy L Rude
(74) *Attorney, Agent, or Firm* — Winston Hsu; Scott Margo

(57) ABSTRACT

A pixel array of a fringe field switching (FFS) liquid crystal display panel includes a plurality of gate lines, a plurality of data line, a plurality of pixel electrodes, a plurality of common lines, and a plurality of pixel units aligned in an array configuration. The gate lines are disposed parallel to each other along a first direction. The data lines are disposed parallel to each other along a second direction. Each of the pixel units includes at least one sub-pixel region. The common lines are disposed along the first direction and electrically isolated from each other. Each of the common lines includes a plurality of common electrodes extending along the second direction. The two adjacent common electrodes of each common line are respectively disposed in the two adjacent pixel units which are located in different rows.

7 Claims, 14 Drawing Sheets

(56) References Cited

U.S. PATENT DOCUMENTS

| | | |
|---|---|---|
| 8,174,655 B2 * | 5/2012 | Park et al. .................... 349/141 |
| 2001/0011981 A1 | 8/2001 | Yamamoto |
| 2004/0085503 A1 | 5/2004 | Kim |
| 2004/0263743 A1 | 12/2004 | Kim |
| 2007/0165171 A1 * | 7/2007 | Lee .............................. 349/139 |
| 2007/0222907 A1 | 9/2007 | Onogi |
| 2008/0042963 A1 | 2/2008 | Fujita |
| 2008/0136982 A1 | 6/2008 | Watanabe |
| 2008/0297676 A1 * | 12/2008 | Kimura .......................... 349/39 |
| 2010/0164850 A1 | 7/2010 | Pai |
| 2012/0235965 A1 | 9/2012 | Pai |

FOREIGN PATENT DOCUMENTS

| | | |
|---|---|---|
| CN | 102201213 A | 9/2011 |
| JP | 2005037763 | 2/2005 |
| JP | 200747349 | 2/2007 |

* cited by examiner

PIXEL ARRAY OF FRINGE FIELD SWITCHING LIQUID CRYSTAL DISPLAY PANEL AND DRIVING METHOD THEREOF

CROSS REFERENCE TO RELATED APPLICATIONS

This application is a continuation in part of U.S. application Ser. No. 13/172,766, filed 2011 Jun. 29.

BACKGROUND

1. Technical Field

The disclosure relates to a pixel array of a fringe field switching liquid crystal display panel and a driving method thereof, and more particularly, to a pixel array of a fringe field switching liquid crystal display panel with a plurality of common lines and a driving method thereof.

2. Description of the Related Art

Liquid crystal display panels are applied in many kinds of consumer electronics such as flat TVs, laptop computers, and cell phones. Fringe field switching (FFS) liquid crystal display panels have been developed for improving narrow viewing angle issues in liquid crystal display panels. The main features of the FFS liquid crystal display panel include that common electrodes and pixel electrodes are disposed in different layers of an array substrate (also called a thin film transistor substrate), and a wide viewing angle effect may be achieved by an electrical field generated by the common electrode and the pixel electrode. However, in conventional fringe field switching liquid crystal display panels, a plurality of common lines, which connect to the common electrodes, are electrically connected to each other and may not be driven independently. Therefore, driving methods of the array substrate have to be more complicated for presenting different display driving effects, such as a dot inversion driving effect. This results in driving up the cost of integrated circuits (ICs) and high power consumption for driving the array substrate, also leads away from goals of energy saving and carbon reduction.

SUMMARY OF THE DISCLOSURE

An embodiment provides a pixel array of a fringe field switching liquid crystal display panel. The pixel array of the fringe field switching liquid crystal display panel comprises a plurality of gate lines, a plurality of data lines, a plurality of pixel electrodes, and a plurality of common lines. The gate lines are disposed parallel to each other substantially along a first direction. The data lines are disposed parallel to each other substantially along a second direction. A plurality of pixel units, which are aligned in an array configuration, are defined by the gate lines and the data lines. Each of the pixel units includes at least one sub-pixel region. Each of the pixel electrodes is respectively disposed in each of the sub-pixel regions. The common lines are disposed substantially along the first direction and electrically isolated from each other. Each of the common lines includes a plurality of common electrodes extending along the second direction. The two adjacent common electrodes of each common line are respectively disposed in the two adjacent pixel units located in different rows.

Another embodiment provides a driving method of a fringe field switching liquid crystal display panel. The driving method of the fringe field switching liquid crystal display panel comprises the following steps. Firstly a pixel array is provided. The pixel array includes a plurality of gate lines, a plurality of data lines, a plurality of pixel units aligned in an array configuration, a plurality of pixel electrodes, and a plurality of common lines. Each of the pixel units includes at least one sub-pixel region, and each of the pixel electrodes is disposed respectively in each of the sub-pixel regions. The common lines are electrically isolated from each other. Each of the common lines includes a plurality of common electrodes. The two adjacent common electrodes of each common line are respectively disposed in the two adjacent pixel regions located in different rows. A plurality of common signals is then provided to the common lines for driving the pixel array. Within one frame time, a level of the common signals provided to the odd common lines is different from a level of the common signals provided to the even common lines.

Another embodiment provides a pixel array of a fringe field switching liquid crystal display panel. The pixel array of the fringe field switching liquid crystal display panel comprises a plurality of gate lines, a plurality of data lines, a plurality of pixel units, a plurality of pixel electrodes, and a plurality of common lines. The gate lines are disposed parallel to each other substantially along a first direction. The data lines are disposed parallel to each other substantially along a second direction. The pixel units are aligned in an array configuration. Each of the pixel units includes at least one sub-pixel region, and two adjacent pixel units located in an identical row are disposed and shifted relatively along the second direction. Each of the pixel electrodes is respectively disposed in each of the sub-pixel regions. The common lines are disposed substantially along the first direction and are electrically isolated from each other. Each of the common lines includes a plurality of common electrodes extending along the second direction. The two adjacent common electrodes of each common line are respectively disposed in the two adjacent pixel units located in different rows.

In the pixel array of the fringe field switching liquid crystal display panel, the common lines, which may be driven independently, are employed with the allocation approaches of the common electrodes in the sub-pixel regions for presenting a dot inversion driving effect by a simplified driving method. Costs of the driving ICs may then be reduced, and the power consumption of the fringe field switching liquid crystal display panel may be also improved.

These and other objectives of the disclosure will no doubt become obvious to those of ordinary skill in the art after reading the following detailed description of the preferred embodiment that is illustrated in the various figures and drawings.

DETAILED DESCRIPTION

To provide a better understanding to skilled users in the technology, the embodiments will be detailed as follows. The embodiments are illustrated in the accompanying drawings with numbered elements to elaborate the contents and effects to be achieved.

Figure 1:
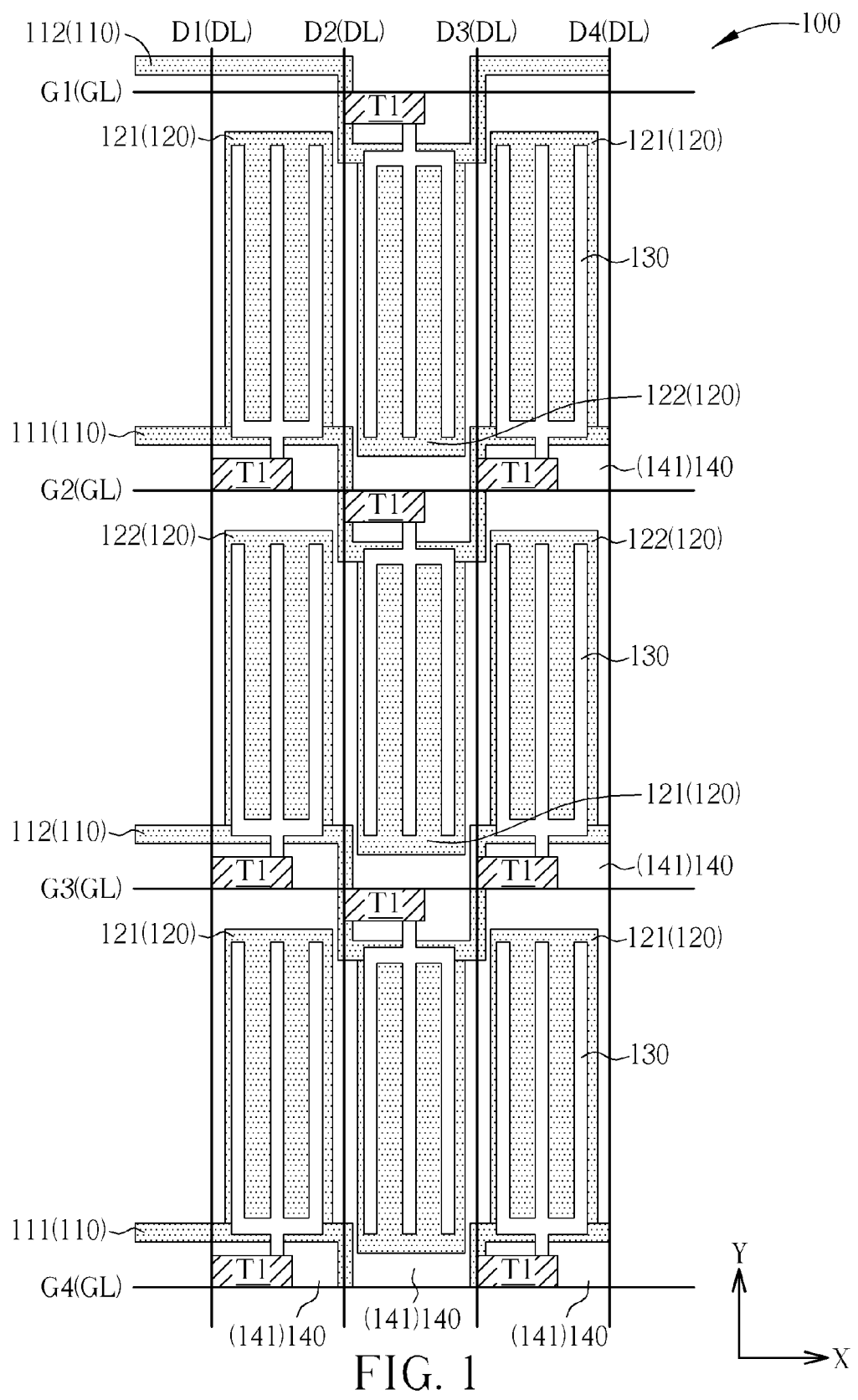
FIG. 1 is a schematic diagram illustrating a pixel array of a fringe field switching liquid crystal display panel according to a first embodiment.
Figure 2:
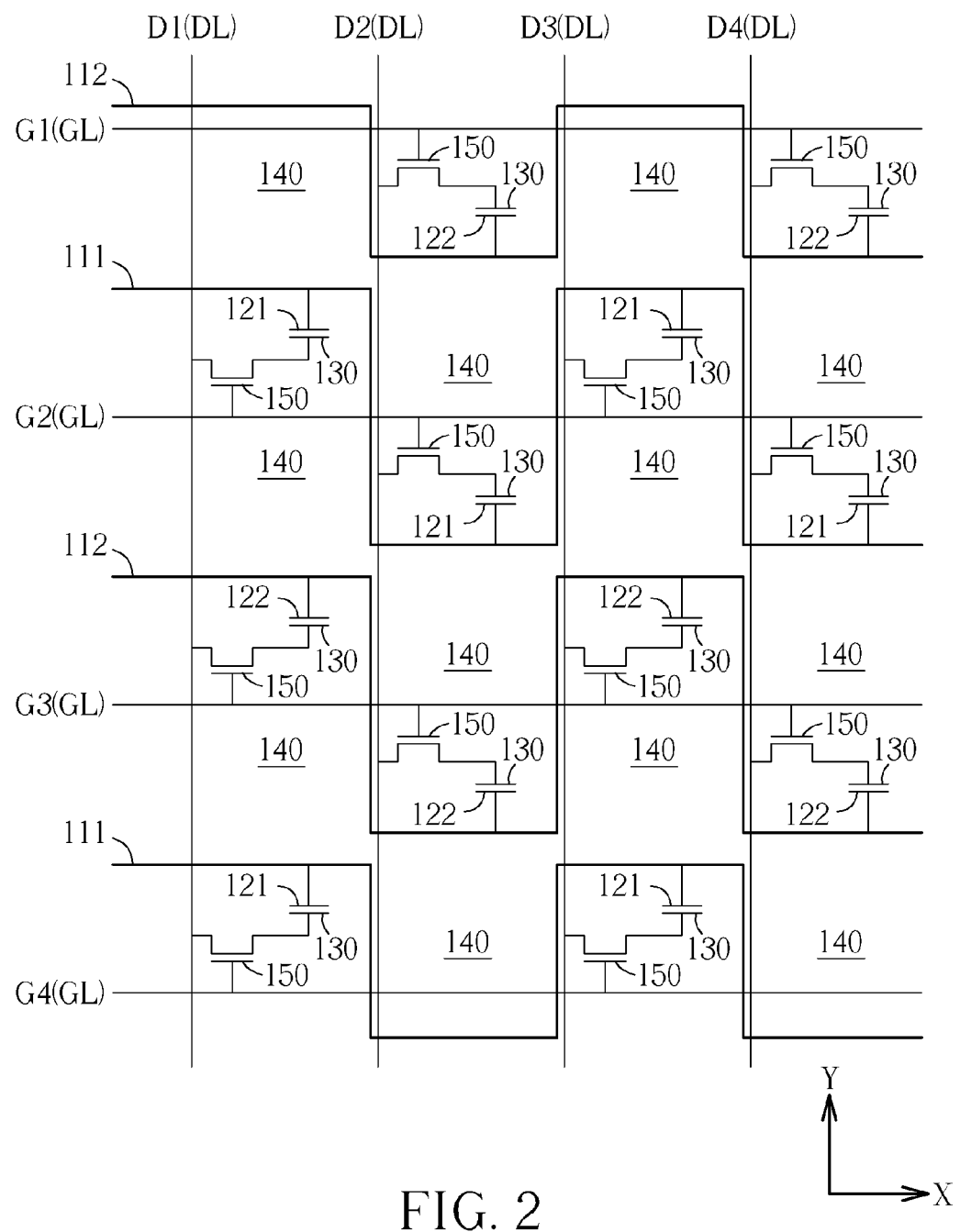
FIG. 2 is a schematic diagram illustrating electrical circuits of a pixel array of a fringe field switching liquid crystal display panel according to the first embodiment.
Figure 3:
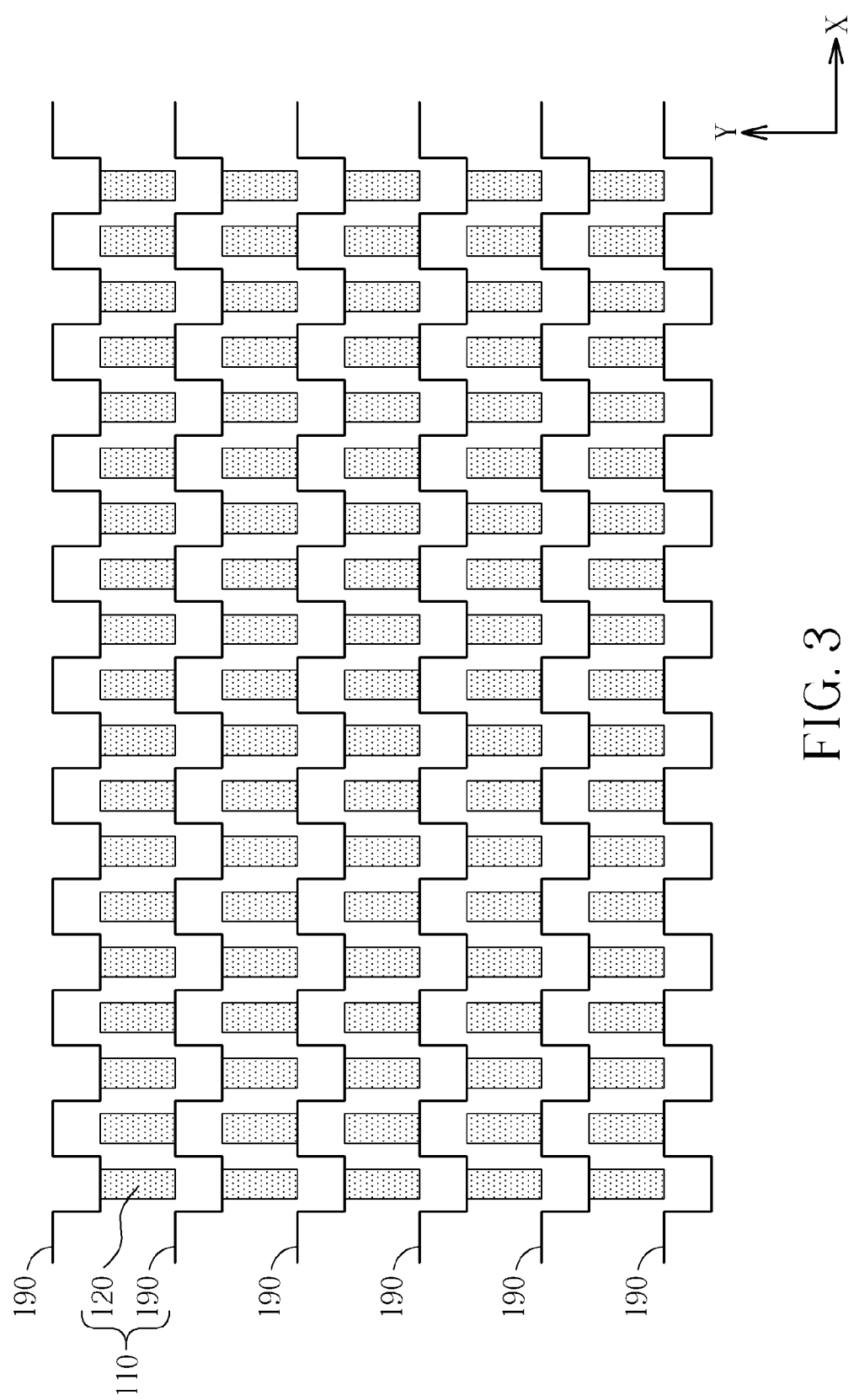
FIG. 3 is a schematic diagram illustrating common lines and common electrodes of a fringe field switching liquid crystal display panel according to the first embodiment.

Please refer to FIGS. 1-3. FIG. 1 is a schematic diagram illustrating a pixel array of a fringe field switching liquid crystal display panel according to a first embodiment. FIG. 2 is a schematic diagram illustrating electrical circuits of the pixel array of the fringe field switching liquid crystal display panel according to this embodiment. FIG. 3 is a schematic diagram illustrating common lines and common electrodes of the fringe field switching liquid crystal display panel according to this embodiment. Please note that the figures are only for illustration and the figures may not be to scale. The scale may be further modified according to different design considerations. As shown in FIG. 1, in this embodiment, a pixel array 100 of a fringe field switching liquid crystal display panel is provided. The pixel array 100 includes a plurality of gate lines GL, a plurality of data lines DL, a plurality of pixel electrodes 130, and a plurality of common lines 110. The gate lines GL are disposed parallel to each other substantially along a first direction X. The data lines DL are disposed parallel to each other substantially along a second direction Y. A plurality of pixel units 140, which are aligned in an array configuration, are defined by the gate lines GL and the data lines DL. Each of the pixel units 140 includes one sub-pixel region 141. Each of the pixel electrodes 130 is respectively disposed in each of the sub-pixel regions 141. As shown in FIG. 1, in this embodiment, each of the pixel electrodes 130 includes a plurality of stripe structures for driving the fringe field switching liquid crystal display panel, but the pixel electrode 130 is not limited to this and may be other appropriate structures. As shown in FIG. 1 and FIG. 3, the common lines 110 are disposed substantially along the first direction X and electrically isolated from each other. Each of the common lines 110 includes a plurality of common electrodes 120 extending along the second direction Y. The two adjacent common electrodes 120 of each common line 110 are respectively disposed in the two adjacent pixel units 140 located in different rows. In other words, the two adjacent common electrodes 120 of each common line 110 in this embodiment are respectively disposed in the two adjacent sub-pixel regions 141 located in different rows. It is worth noticing that, as shown in FIG. 3, the common line 110 may include a common lead 190 and a plurality of common electrodes 120. In the embodiment, each of the common lines 110 may consist of at least one transparent conductive material such as indium tin oxide (ITO), but the embodiment is not limited to this. In other words, the common lead 190 and the common electrode 120 may be made of an identical transparent conductive material, or the common lead 190 may be made of a non-transparent conductive material while the common electrode 120 is made of a transparent conductive material. For example, if a concern of electrical resistances of the common lines in the fringe field switching liquid crystal display panel is relatively important, metal conductive materials with lower electrical resistance may be used to form the common leads 190. The common leads 190 made of metal conductive materials are electrically connected to the common electrode 120 made of transparent conductive materials for forming the common lines 110. The electrical resistance of the common lines 110 can be reduced. On the other hand, if a concern of an aperture ratio of the pixel array in the fringe field switching liquid crystal display panel is relatively important, the common lead 190 and the common electrode 120 may be made of an identical transparent conductive material for enhancing the aperture ratio of the pixel array. Purposes of design simplification and process reduction may also be achieved because no additional designs and processes are required for electrically connecting the common leads 190 and the common electrodes 120. In addition, as shown in FIGS. 1-2, the gate lines include a gate line G1, a gate line G2, a gate line G3, and a gate line G4. The data lines include a data line D1, a data line D2, a data line D3, and a data line D4. In this embodiment, an area between the gate line G1 and the gate line G2 is defined as an odd row, an area between the gate line G2 and the gate line G3 is defined as an even row, an area between the gate line G3 and the gate line G4 is also defined as an odd row, and other areas between the gate lines are also defined by this rule. Additionally, an area between the data line D1 and the data line D2 is defined as an odd column, an area between the data line D2 and the data line D3 is defined as an even column, an area between the data line D3 and the data line D4 is also defined as an odd column, and other areas between the data lines are also defined by this rule. In this embodiment, the common lines 110 include a plurality of first common lines 111 and a plurality of second common lines 112. Each of the first common lines 111 includes a plurality of first common electrodes 121 disposed respectively in the pixel units 140 located in all odd columns of a corresponding odd row and the pixel unit 140 located in all even columns of a corresponding even row. Each of the second common lines 112 includes a plurality of second common electrodes 122 disposed respectively in the pixel units 140 located in all odd columns of a corresponding even row and the pixel units 140 located in all even columns of a corresponding odd row. In other words, in this embodiment, each of the first common lines 111 includes a plurality of first common electrodes 121 disposed respectively in the sub-pixel regions 141 located in all odd columns of a corresponding odd row and the sub-pixel regions 141 located in all even columns of a corresponding even row. Each of the second common lines 112 includes a plurality of second common electrodes 122 disposed respectively in the sub-pixel regions 141 located in all odd columns of a corresponding even row and the sub-pixel regions 141 located in all even columns of a corresponding odd row. Additionally, it is worth noticing that each of the gate lines GL includes a plurality of gate electrodes 150, the two adjacent gate electrodes 150 of each gate line GL are respectively disposed in the two adjacent sub-pixel regions 141 located in different rows. The pixel electrodes 130 disposed in the sub-pixel regions 141 in an identical column are electrically connected to an identical data line DL. In other words, as shown in FIG. 1, the pixel array 100 may further include a plurality of switching devices T1 respectively disposed in each of the sub-pixel regions 141. Each of the switching devices T1 is electrically connected to the gate lines GL, the data lines DL, and the pixel electrodes 130. Each of the pixel electrodes 130 may be controlled by providing signals to each of the corresponding switching devices T1 via the gate lines GL and the data lines DL. In the embodiment, the switching device T1 may include an amorphous silicon thin film transistor (a-Si TFT), a poly silicon thin film transistor (poly-Si TFT), an oxide semiconductor thin film transistor (oxide TFT), or other appropriate switching devices. In this embodiment, the two adjacent switching devices T1, which are electrically connected to an identical gate line GL, are electrically connected to the two adjacent pixel electrodes 130 in different rows. The two adjacent switching devices T1, which are electrically connected to an identical data line DL, are electrically connected to the two adjacent pixel electrodes 130 in an identical column. Based on the design of allocation described above, the pixel electrodes 130 connected to the gate line GL may correspond with the common electrodes 120 of the common line 110 adjacent to the gate line GL, and designs of driving signals via the gate lines GL and the common lines 110 may then become more simplified.

Figure 4:
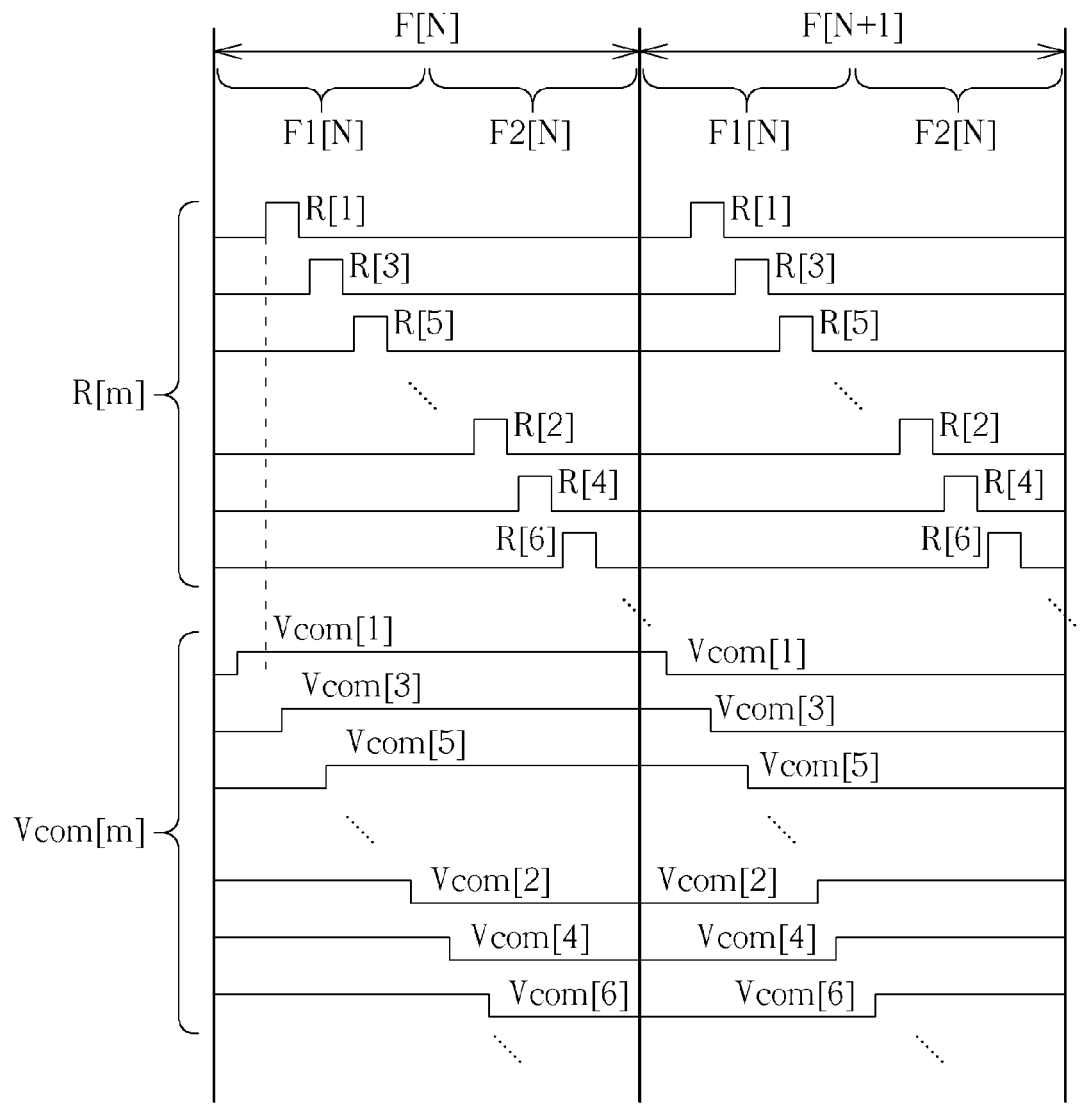
FIG. 4 is a schematic diagram illustrating timings of a driving method of a fringe field switching liquid crystal display panel according to the first embodiment.

Please refer to FIG. 4 and refer to FIGS. 1-2 together. FIG. 4 is a schematic diagram illustrating timings of a driving method of a fringe field switching liquid crystal display panel according to the first embodiment. In the driving method of the fringe field switching liquid crystal display panel of this embodiment, the structure and properties of the pixel array 100 have been detailed above and will not be redundantly described. As shown in FIG. 4 and FIGS. 1-2, in this embodiment, the driving method of the fringe field switching liquid crystal display panel includes providing a plurality of common signals Vcom[m] to the common lines 110 for driving the pixel array 100, wherein within one frame time F[N], a level of the common signals Vcom[m] provided to the odd common lines 110 is different from a level of the common signals Vcom[m] provided to the even common lines 110. Additionally, a condition of high/low level of the common signals Vcom[m] provided to the common lines 110 in one frame time F[N] is opposite to a condition of high/low level of the common signals Vcom[m] provided to the common lines 110 in a next frame time F[N+1]. For example, common signals Vcom[1], Vcom[3], and Vcom[5] are provided to the odd common lines 110, common signals Vcom[2], Vcom[4], and Vcom[6] are provided to the even common lines 110, and so forth. In this embodiment, within one frame time F[N], Vcom[1], Vcom[3], and Vcom[5] are orderly provided to the corresponding odd common lines 110 in high level, and Vcom[1], Vcom[3], and Vcom[5] are orderly provided to the corresponding odd common lines 110 in low level within a next frame time F[N+1]. Meanwhile, within the frame time F[N], Vcom[2], Vcom[4], and Vcom[6] are orderly provided to the corresponding even common lines 110 in low level, and Vcom[2], Vcom[4], and Vcom[6] are orderly provided to the corresponding even common lines 110 in high level within a next frame time F[N+1]. In addition, the driving method of the fringe field switching liquid crystal display panel provided in this embodiment may further include: diving the frame time F[N] into a first sub frame time F1[N] and a second sub frame time F2[N]; orderly providing the common signals Vcom[m], such as Vcom[1], Vcom[3], and Vcom[5], to the odd common lines 110 within the first sub frame time F1[N]; and orderly providing the common signals Vcom[m], such as Vcom[2], Vcom[4], and Vcom[6], to the even common lines 110 within the second sub frame time F2[N]. Relatively, in this embodiment, a plurality of gate signals R[m], such as a gate signal R[1], a gate signal R[3], and a gate signal R[5], are orderly provided to the odd gate lines GL within the first frame time F1[N], and a plurality of gate signals R[m], such as a gate signal R[2], a gate signal R[4], and a gate signal R[6], are orderly provided to the even gate lines GL within the second frame time F2[N]. In this embodiment, because the frame time F[N] is divided into the first frame time F1[N] and the second frame time F2[N], a frequency of switching high/low level of the common signals Vcom[m] may become slow and loadings of signal processing may then be decreased, but the driving method of the fringe field switching liquid crystal display panel in the disclosure is not limited to this and may include orderly providing the common signals and the gate signals in a progressive (row-by-row) mode. Additionally, the driving method of the fringe field switching liquid crystal display panel provided in this embodiment may further include providing a plurality of data signals (not shown) to the data lines by a frame inversion driving approach. It is worth noticing that the common lines 110, which are electrically isolated from each other, are employed for providing different common signals, and the structure of the pixel array 100 is employed to coordinate the common signals and the gate signals. Therefore, the data signals may be provided by the frame inversion driving approach for generating a dot inversion driving effect in the pixel array 100 of the fringe field switching liquid crystal display panel.

The following description will detail the different embodiments of the pixel array of the fringe field switching liquid crystal display panel and the driving method thereof in the disclosure. To simplify the description, the identical components in each of the following embodiments are marked with identical symbols. For making it easier to compare the difference between the embodiments, the following description will detail the dissimilarities among different embodiments and the identical features will not be redundantly described.

Figure 5:
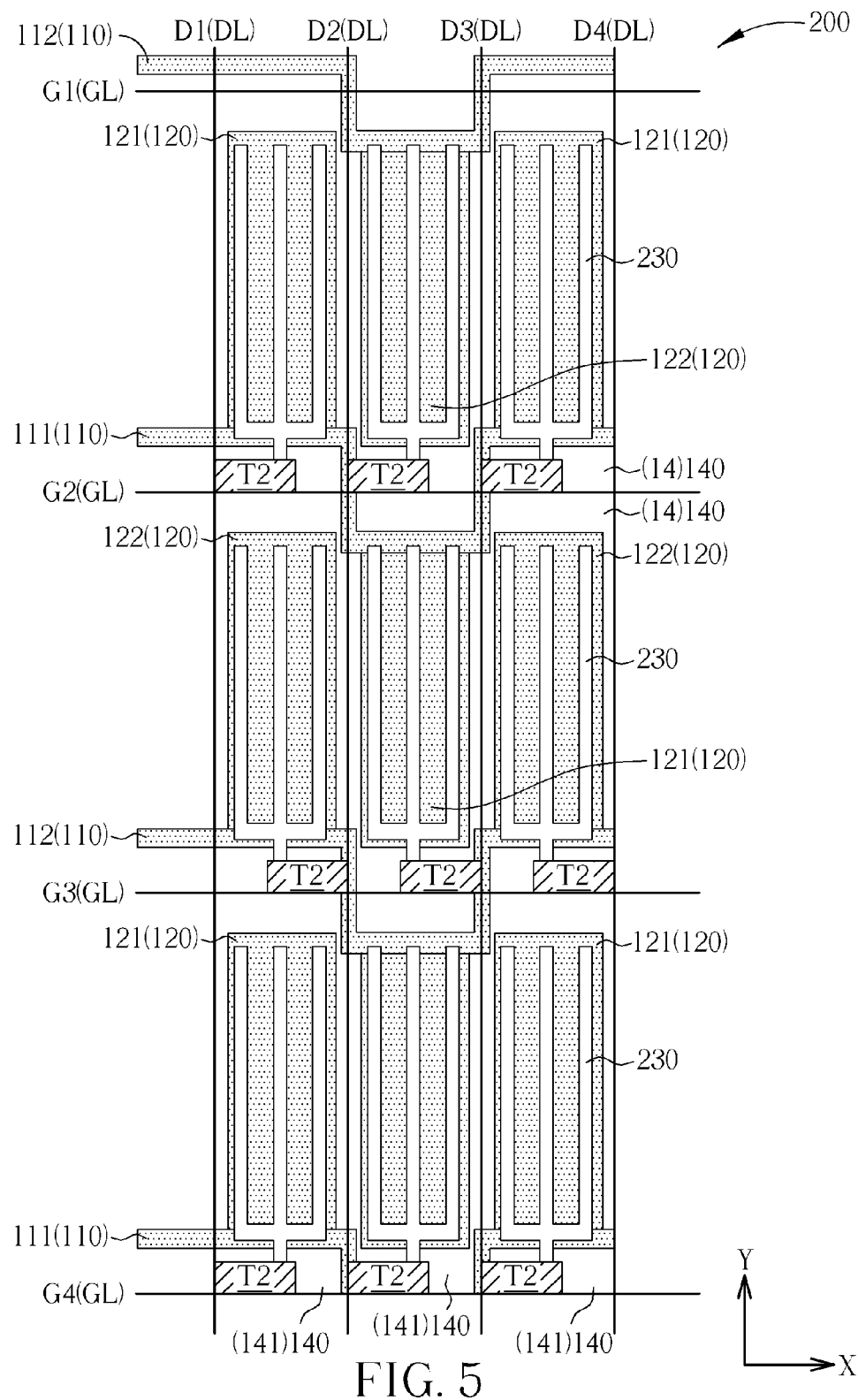
FIG. 5 is a schematic diagram illustrating a pixel array of a fringe field switching liquid crystal display panel according to a second embodiment.
Figure 6:
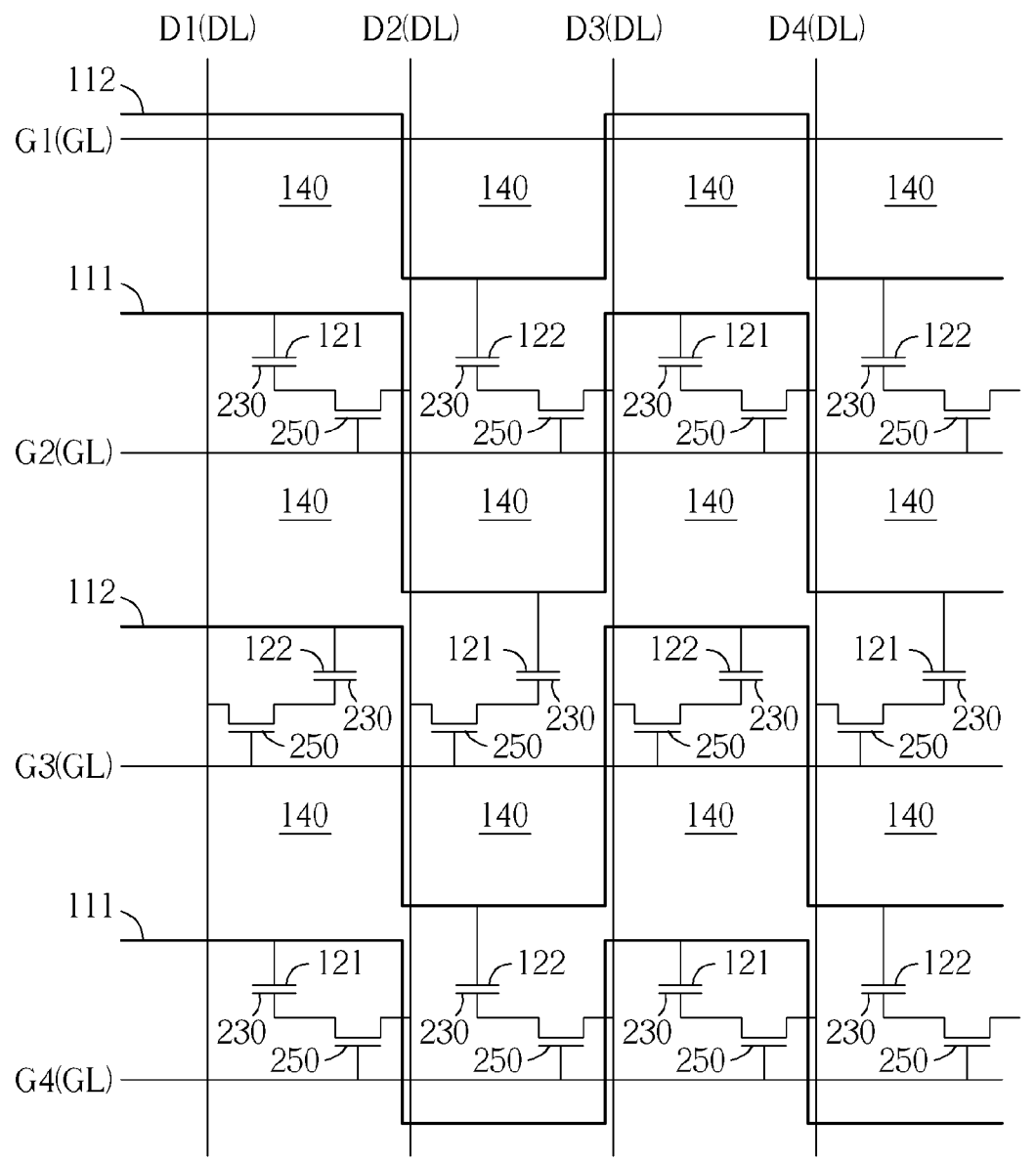
FIG. 6 is a schematic diagram illustrating electrical circuits of a pixel array of a fringe field switching liquid crystal display panel according to the second embodiment.

Please refer to FIGS. 5-6. FIG. 5 is a schematic diagram illustrating a pixel array of a fringe field switching liquid crystal display panel according to a second embodiment. FIG. 6 is a schematic diagram illustrating electrical circuits of a pixel array of a fringe field switching liquid crystal display panel according to the second embodiment. Please note that the figures are only for illustration and the figures may not be to scale. The scale may be further modified according to different design considerations. As shown in FIGS. 5-6, a pixel array 200 of a fringe field switching liquid crystal display panel is provided in this embodiment. The differences between the pixel array 200 and the pixel array 100 mentioned above is that in the pixel array 200 of this embodiment, the two pixel electrodes 230 disposed in the two adjacent sub-pixel regions 141 in an identical column are electrically connected respectively to different data lines DL, each of the gate lines GL includes a plurality of gate electrodes 250, and the gate electrodes 250 of each gate line GL are disposed in the sub-pixel regions 141 located in an identical row. In other words, as shown in FIG. 5, the pixel array 200 may further include a plurality of switching devices T2 respectively disposed in each of the sub-pixel regions 141. Each of the switching devices T2 is electrically connected to the gate lines GL, the data lines DL, and the pixel electrodes 230. Each of the pixel electrodes 230 may be controlled by providing signals to each of the corresponding switching devices T2 via the gate lines GL and the data lines DL. In this embodiment, the two adjacent switching devices T2, which are electrically connected to an identical gate line GL, are electrically connected to the two adjacent pixel electrodes 230 in an identical row. The two adjacent switching devices T2, which are electrically connected to an identical data line DL, are electrically connected to the two adjacent pixel electrodes 230 in different rows or in different columns. Based on the design of allocation described above, the pixel electrodes 230 connected to the data line DL may correspond with the common electrodes 120 of the corresponding common line 110 in two adjacent columns, and designs of driving signals via the data lines DL and the common lines 110 may then become more simplified.

Figure 7:
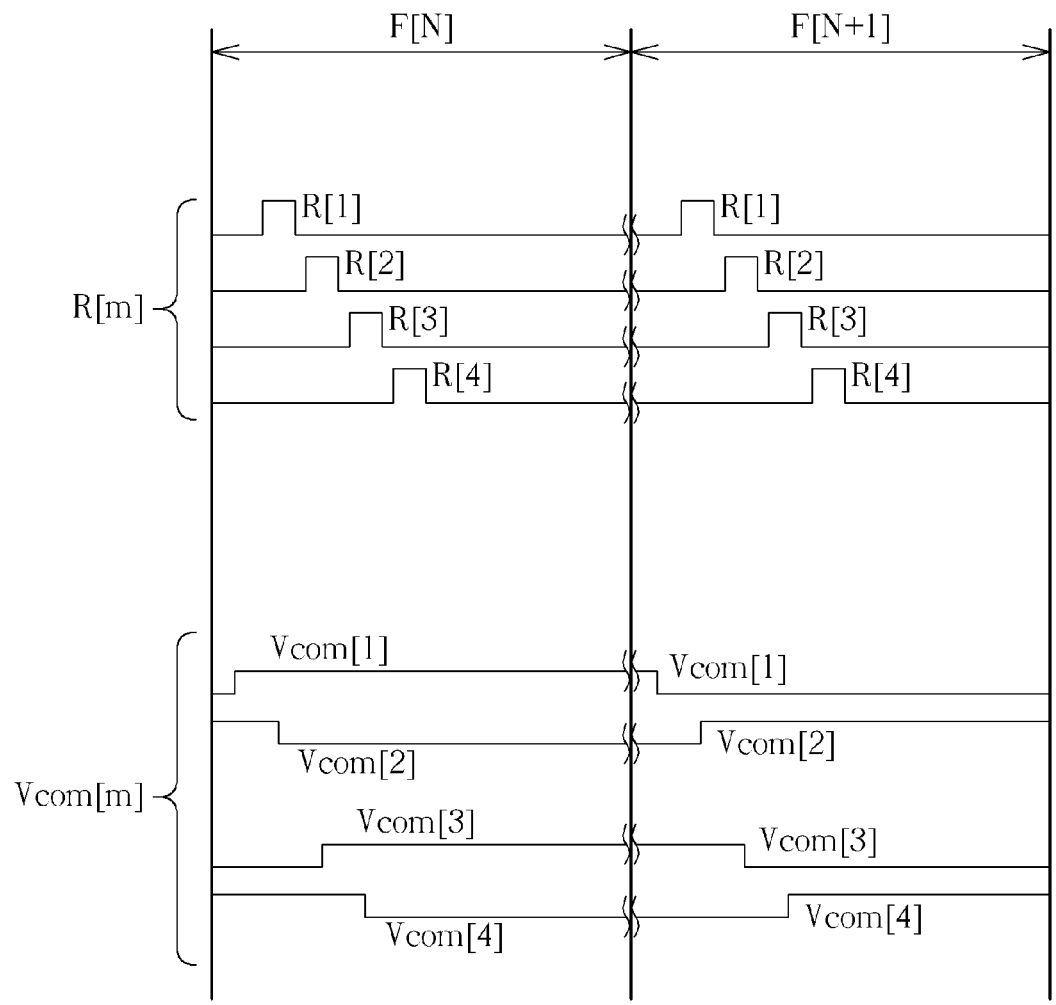
FIG. 7 is a schematic diagram illustrating timings of a driving method of a fringe field switching liquid crystal display panel according to the second embodiment.

Please refer to FIG. 7, and refer to FIGS. 5-6 together. FIG. 7 is a schematic diagram illustrating timings of a driving method of a fringe field switching liquid crystal display panel according to the second embodiment. In the driving method of the fringe field switching liquid crystal display panel of this embodiment, the structure and properties of the pixel array 200 have been detailed above and will not be redundantly described. As shown in FIG. 7 and FIG. 5, in this embodiment, the driving method of the fringe field switching liquid crystal display panel includes providing a plurality of common signals Vcom[m] to the common lines 110 for driving the pixel array 200, wherein within one frame time F[N], a level of the common signals Vcom[m] provided to the odd common lines 110 is different from a level of the common signals Vcom[m] provided to the even common lines 110. Additionally, a condition of high/low level of the common signals Vcom[m] provided to the common lines 110 in one frame time F[N] is opposite to a condition of high/low level of the common signals Vcom[m] provided to the common lines 110 in a next frame time F[N+1]. For example, a common signal Vcom[1] and a common signal Vcom[3] are provided to the odd common lines 110, a common signal Vcom[2] and a common signal Vcom[4] are provided to the even common line 110, and so forth. In this embodiment, within one frame time F[N], the common signals Vcom[m], such as the common signal Vcom[2] and the common signal Vcom[4], are orderly provided to the corresponding even common lines 110 in low level, and the common signal Vcom[m], such as the common signal Vcom[2] and the common signal Vcom[4], are orderly provided to the corresponding even common lines 110 in high level within a next frame time F[N+1]. Meanwhile, within one frame time F[N], the common signals Vcom[m], such as the common signal Vcom[1] and the common signal Vcom[3], are orderly provided to the corresponding odd common lines 110 in high level, and the common signals, such as common signal Vcom[1] and the common signal Vcom[3], are orderly provided to the corresponding odd common lines 110 in low level within a next frame time F[N+1]. In addition, the driving method of the fringe field switching liquid crystal display panel provided in this embodiment may further include orderly providing a plurality of gate signals R[m], such as a gate signal R[1], a gate signal R[2], a gate signal R[3], and a gate signal R[4], to the corresponding gate lines GL. Additionally, the driving method of the fringe field switching liquid crystal display panel provided in this embodiment may further include providing a plurality of data signals (not shown) to the data lines by a column inversion driving approach. It is worth noticing that the common lines 110, which are electrically isolated from each other, are employed for providing different common signals, and the structure of the pixel array 200 is employed to coordinate the common signals and the data signals. Therefore, the data signals may be provided by the column inversion driving approach for generating a dot inversion driving effect in the pixel array 200 of the fringe field switching liquid crystal display panel.

Figure 8:
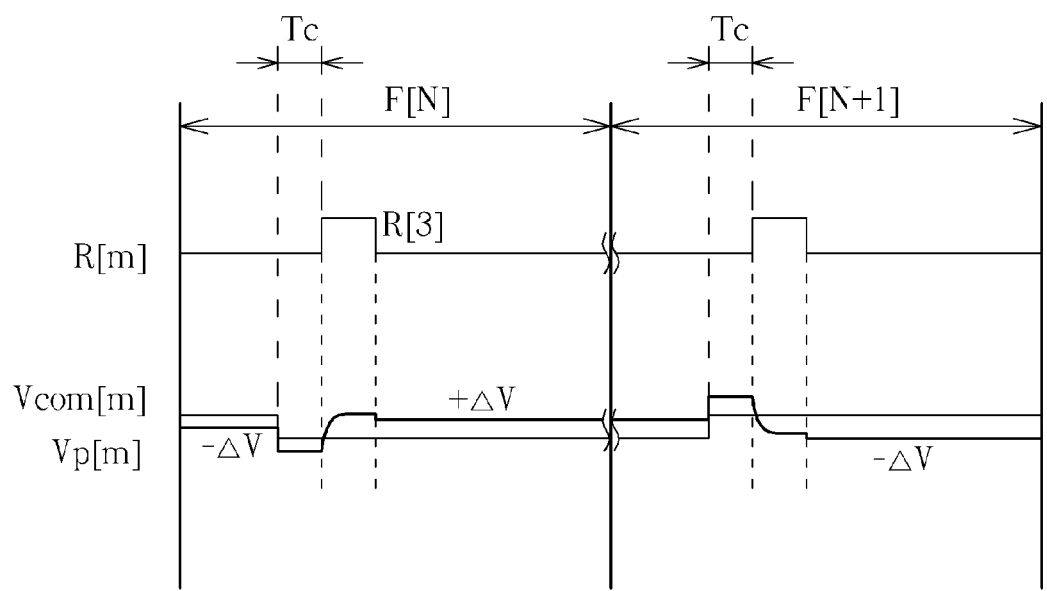
FIG. 8 is a schematic diagram illustrating timings of a driving method of a fringe field switching liquid crystal display panel according to another embodiment.

Please refer to FIG. 8, and refer to FIG. 1 and FIG. 5 together. FIG. 8 is a schematic diagram illustrating timings of a driving method of a fringe field switching liquid crystal display panel according to another embodiment. Both of the pixel array 100 and the pixel array 200 are compatible with the driving method of a fringe field switching liquid crystal display panel in this embodiment. The structures and properties of the pixel array 100 and the pixel array 200 have been detailed above and will not be redundantly described. As shown in FIG. 8, FIG. 1 and FIG. 5, in this embodiment, the driving method of the fringe field switching liquid crystal display panel includes providing a plurality of common signals Vcom[m] to the common lines 110, and the details are similar to those in the above-mentioned embodiments and will not be redundantly described. Additionally, in this embodiment, the driving method of the fringe field switching liquid crystal display panel further includes orderly providing a plurality of gate signals R[m] to the gate lines GL, wherein a timing of each common signal Vcom[m] is earlier than a timing of the corresponding gate signals R[m]. As shown in FIG. 8, within the frame time F[N], the common signal Vcom[m] transfers from high level to low level before the corresponding gate signal R[m] arrives, and a corresponding pixel voltage Vp[m] is accordingly decreased for maintaining a condition of negative voltage difference (−ΔV). A pixel is then charged by the gate signal R[m] after one compensatory time Tc, and the pixel voltage Vp[m] is accordingly increased for generating a condition of positive voltage difference (+ΔV) within the frame time F[N]. Within a next frame time F[N+1], the common signal Vcom[m] transfers from low level to high level before the corresponding gate signal R[m] arrives, and a corresponding pixel voltage Vp[m] is accordingly increased for maintaining a condition of positive voltage difference (+ΔV). A pixel is then discharged by the gate signal R[m] after one compensatory time Tc, and the pixel voltage Vp[m] is accordingly decreased for generating a condition of negative voltage difference (−ΔV) within the next frame time F[N+1]. It is worth noticing that the driving method described above is developed mainly for a consideration that a transferring time of the common signal and a display quality of the fringe field switching liquid crystal display panel may be influenced by a conductive material, which is employed to form the common lines 110, with higher resistivity, especially when the common lines 110 are formed by a transparent conductive material, such as indium tin oxide. However, the driving method in this embodiment is not limited to this and may be employed for improving other issues. Therefore, the display quality of the fringe field switching liquid crystal display panel may be effectively ensured by the driving method with the compensatory time Tc in this embodiment.

Figure 9:
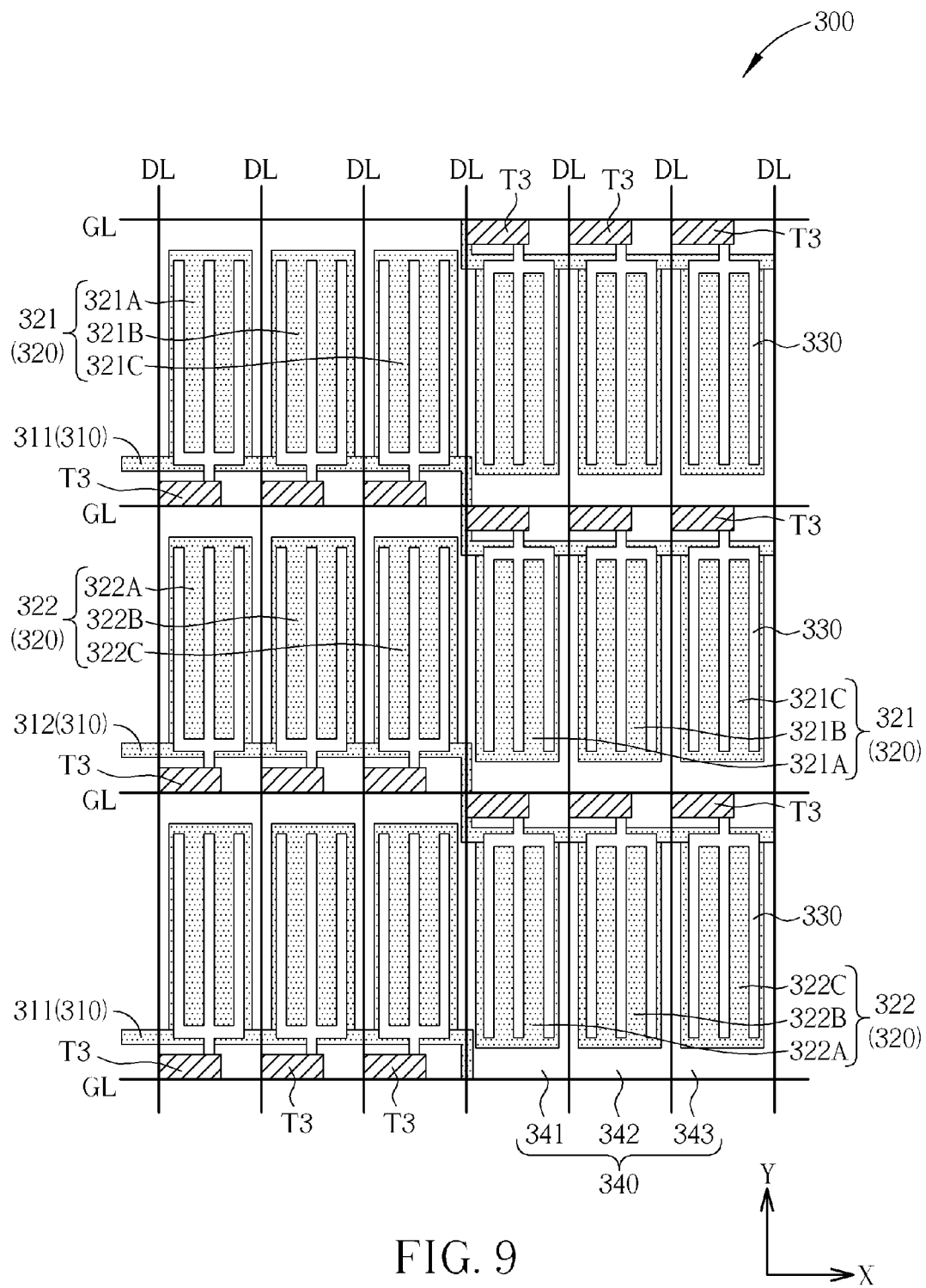
FIG. 9 is a schematic diagram illustrating a pixel array of a fringe field switching liquid crystal display panel according to a third embodiment.

Please refer to FIG. 9. FIG. 9 is a schematic diagram illustrating a pixel array of a fringe field switching liquid crystal display panel according to a third embodiment. As shown in FIG. 9, in this embodiment, a pixel array 300 of a fringe field switching liquid crystal display panel is provided. The pixel array 300 includes a plurality of gate lines GL, a plurality of data lines DL, a plurality of pixel electrodes 330, and a plurality of common lines 310. A plurality of pixel units 340, which are aligned in an array configuration, is defined by the gate lines GL and the data lines DL. The common lines 310 are disposed substantially along the first direction X and are electrically isolated from each other. Each of the common lines 310 includes a plurality of common electrodes 320 extending along the second direction Y. The two adjacent common electrodes 320 of each common line 310 are respectively disposed in the two adjacent pixel units 340 located in different rows. The difference between the pixel array 300 of this embodiment and the pixel array 100 of the first embodiment is that, in this embodiment, each of the pixel units 340 preferably includes a plurality of sub-pixel regions, and the each of the common electrodes 320 preferably includes a plurality of sub common electrodes respectively disposed in each of the corresponding sub-pixel regions. For example, each of the pixel units 340 may include one sub-pixel region 341, one sub-pixel region 342, and one sub-pixel region 343 disposed adjacently along the first direction X, but not limited thereto. The common lines 310 may include a first common line 311 and a second common line 312. The first common line 311 includes a plurality of first common electrodes 321 disposed respectively in the pixel units 340 located in all odd columns of a corresponding odd row and the pixel unit 340 located in all even columns of a corresponding even row. The second common line 312 includes a plurality of second common electrodes 322 disposed respectively in the pixel units 340 located in all odd columns of a corresponding even row and the pixel units 340 located in all even columns of a corresponding odd row. In this embodiment, a pixel unit 340 located in an odd column may be defined as one sub-pixel region 342 located in an even column along with two adjacent sub-pixel regions (one sub-pixel region 341 and one sub-pixel region 343), and a pixel unit 340 located in an even column may be defined as one sub-pixel region 342 located in an odd column along with two adjacent sub-pixel regions (one sub-pixel region 341 and one sub-pixel region 343), but not limited thereto.

The first common electrode 321 may include one sub common electrode 321A, one sub common electrode 321B, and one sub common electrode 321C respectively disposed in the corresponding sub-pixel region 341, the sub-pixel region 342, and the sub-pixel region 343. The second common electrode 322 may include one sub common electrode 322A, one sub common electrode 322B, and one sub common electrode 322C respectively disposed in the corresponding sub-pixel region 341, the sub-pixel region 342, and the sub-pixel region 343. Additionally, each of the pixel electrodes 330 in this embodiment is respectively disposed in each of the sub-pixel regions 341, each of the sub-pixel regions 342, and each of the sub-pixel regions 343. The pixel array 300 may further include a plurality of switching devices T3 respectively disposed in each of the sub-pixel regions 341, each of the sub-pixel regions 342, and each of the sub-pixel regions 343. Each of the switching devices T3 is electrically connected to the gate lines GL, the data lines DL, and the pixel electrodes 330. Each of the pixel electrodes 330 may be controlled by providing signals to each of the corresponding switching devices T3 via the gate lines GL and the data lines DL. Based on the design of the allocation described above, the pixel electrodes 330 connected to the gate line GL may correspond with the common electrodes 320 of the common line 310 adjacent to the gate line GL, and the designs of driving signals via the gate lines GL and the common lines 310 may then become more simplified. More specifically, It is worth noting that because each of the sub common electrodes of each common line 310 is disposed correspondingly to each of the sub-pixel regions of the pixel units 340, which are disposed interlacedly, the common lines 310, which are electrically isolated from each other, may be employed to provide different common signals, and the structure of the pixel array 300 may be employed to coordinate the common signals and the gate signals. Therefore, the data signals may be provided by the frame inversion driving approach to generate a pixel inversion driving effect in the pixel array 300 of the fringe field switching liquid crystal display panel. The driving method of this embodiment is similar to the driving method of the first embodiment detailed above and will not be redundantly described.

Figure 10:
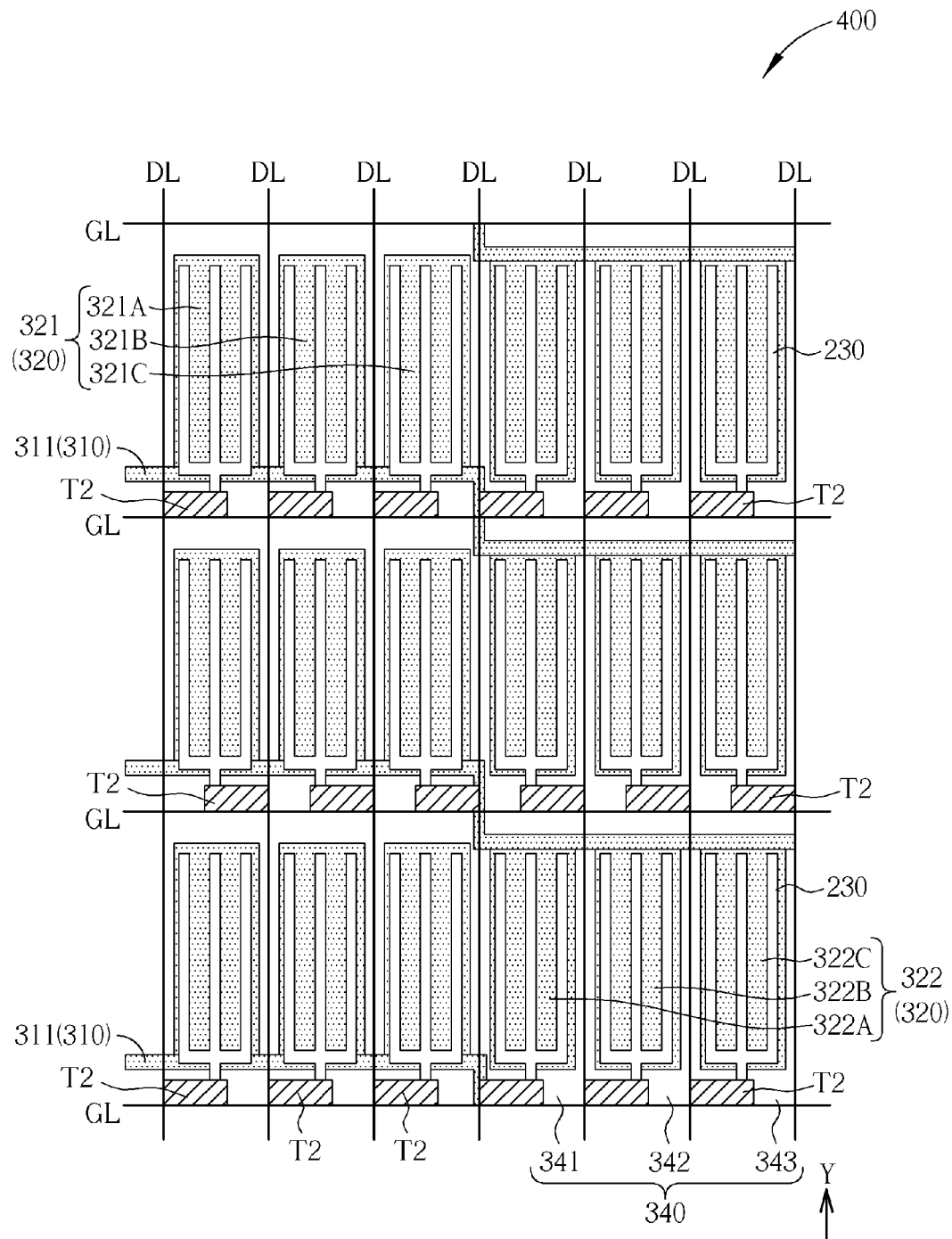
FIG. 10 is a schematic diagram illustrating a pixel array of a fringe field switching liquid crystal display panel according to a fourth embodiment.

Please refer to FIG. 10. FIG. 10 is a schematic diagram illustrating a pixel array of a fringe field switching liquid crystal display panel according to a fourth embodiment. As shown in FIG. 10, in this embodiment, a pixel array 400 of a fringe field switching liquid crystal display panel is provided. The pixel array 400 includes a plurality of gate lines GL, a plurality of data lines DL, a plurality of pixel electrodes 230, and a plurality of common lines 310. The difference between the pixel array 400 of this embodiment and the pixel array 300 of the third embodiment is that, in the pixel array 400, the two pixel electrodes 230 disposed in the two adjacent sub-pixel regions 341 (which may also be the sub-pixel regions 342 and the sub-pixel regions 343) in an identical column are electrically connected respectively to different data lines DL. In other words, apart from the switching devices T3 and the pixel electrodes 230 in the pixel array 400, which are similar to those of the pixel array 200 in the second embodiment, the other components are similar to those of the pixel array 300 in the third embodiment detailed above and will not be redundantly described. Additionally, the driving method of this embodiment is similar to the driving method of the second embodiment. The common lines 310, which are electrically isolated from each other, are employed to provide different common signals, three adjacent data lines DL are defined as one set, and the structure of the pixel array 400 is employed to coordinate the common signals and the data signals. Therefore, the data signals may be provided to each set, which includes three adjacent data lines DL, by the column inversion driving approach to generate a pixel inversion driving effect in the pixel array 400 of the fringe field switching liquid crystal display panel.

Figure 11:
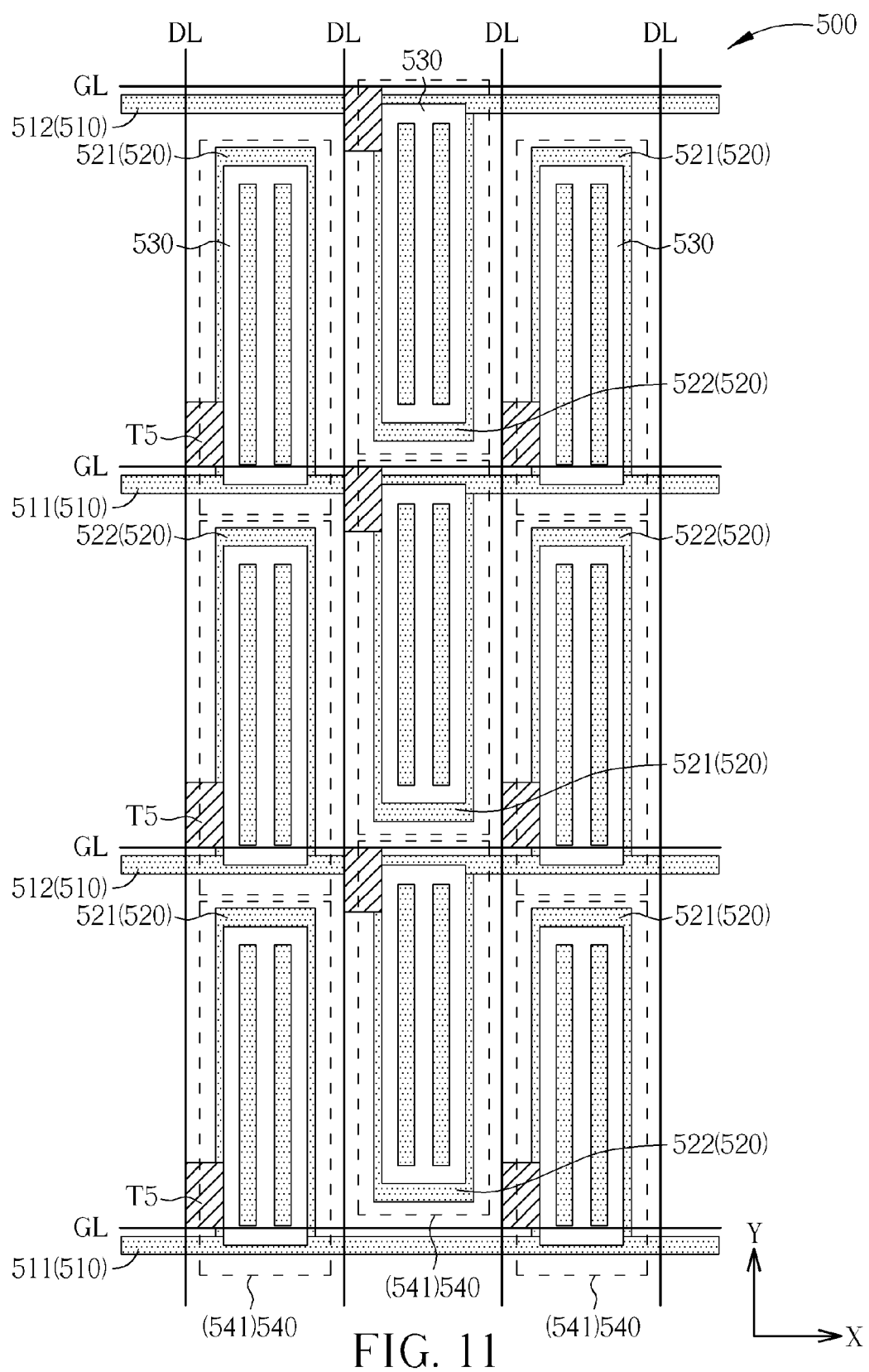
FIG. 11 is a schematic diagram illustrating a pixel array of a fringe field switching liquid crystal display panel according to a fifth embodiment.

Please refer to FIG. 11. FIG. 11 is a schematic diagram illustrating a pixel array of a fringe field switching liquid crystal display panel according to a fifth embodiment. As shown in FIG. 11, in this embodiment, a pixel array 500 of a fringe field switching liquid crystal display panel is provided. The pixel array 500 includes a plurality of gate lines GL, a plurality of data lines DL, a plurality of pixel electrodes 530, a plurality of common lines 510, and a plurality of pixel units 540. The gate lines GL are disposed parallel to each other substantially along a first direction X. The data lines DL are disposed parallel to each other substantially along a second direction Y. The pixel units 540 are aligned in an array configuration. Two adjacent pixel units 540 located in an identical row are disposed and shifted relatively along the second direction Y. In other words, the pixel units 540 located in an identical row are disposed and aligned in a zigzag configuration along the first direction X. Additionally, each of the pixel units 540 in this embodiment includes one sub-pixel region 541. The common lines 510 are disposed substantially along the first direction X and electrically isolated from each other. Each of the common lines 510 includes a plurality of common electrodes 520 extending along the second direction Y. The two adjacent common electrodes 520 of each common line 510 are respectively disposed in the two adjacent pixel units 540 located in different rows. In other words, the two adjacent common electrodes 520 of each common line 510 are respectively disposed in the two adjacent sub-pixel regions 541 located in different rows. Each of the pixel electrodes 530 is respectively disposed in each of the sub-pixel regions 541. In addition, the pixel array 500 in this embodiment may further include a plurality of switching devices T5 respectively disposed in each of the sub-pixel regions 541. Each of the switching devices T5 is electrically connected to the gate lines GL, the data lines DL, and the pixel electrodes 530. Each of the pixel electrodes 530 may be controlled by providing signals to each of the corresponding switching devices T5 via the gate lines GL and the data lines DL. Each of the common lines 510 in this embodiment may preferably include a metal conductive material with low electrical resistance, but not limited thereto. The difference between the pixel array 100 of the first embodiment and the pixel array 500 of this embodiment is that, in this embodiment, each of the common lines 510 may be a straight line because the sub-pixel regions 541 located in an identical row and the corresponding pixel electrodes 530 are disposed and shifted relatively along the second direction Y, and the influence on the aperture ratio may be accordingly lowered.

In this embodiment, the common lines 510 include a plurality of first common lines 511 and a plurality of second common lines 512. Each of the first common lines 511 includes a plurality of first common electrodes 521 disposed respectively in the pixel units 540 located in all odd columns of a corresponding odd row and the pixel unit 540 located in all even columns of a corresponding even row. Each of the second common lines 512 includes a plurality of second common electrodes 522 disposed respectively in the pixel units 540 located in all odd columns of a corresponding even row and the pixel units 540 located in all even columns of a corresponding odd row. In other words, in this embodiment, each of the first common lines 511 includes a plurality of first common electrodes 521 disposed respectively in the sub-pixel regions 541 located in all odd columns of a corresponding odd row and the sub-pixel regions 541 located in all even columns of a corresponding even row. Each of the second common lines 512 includes a plurality of second common electrodes 522 disposed respectively in the sub-pixel regions 541 located in all odd columns of a corresponding even row and the sub-pixel regions 541 located in all even columns of a corresponding odd row. Additionally, it is worth noting that, in this embodiment, the pixel electrodes 530 in two adjacent sub-pixel regions 541 located in an identical row are electrically connected to different gate lines GL respectively through one switching device T5. The pixel electrodes 530 in the sub-pixel regions 541 located in an identical column are electrically connected to an identical data line DL. In other words, the two adjacent switching devices T5, which are electrically connected to an identical gate line GL, are electrically connected to the two adjacent pixel electrodes 530 in different rows. The two adjacent switching devices T5, which are electrically connected to an identical data line DL, are electrically connected to the two adjacent pixel electrodes 530 in an identical column. Based on the design of allocation described above, the pixel electrodes 530 connected to the gate line GL may correspond to the common electrodes 520 of the common line 510 adjacent to the gate line GL, and designs of driving signals via the gate lines GL and the common lines 510 may then become more simplified. The driving method of the pixel array 500 in this embodiment is similar to the driving method of the first embodiment and will not be redundantly described.

Figure 12:
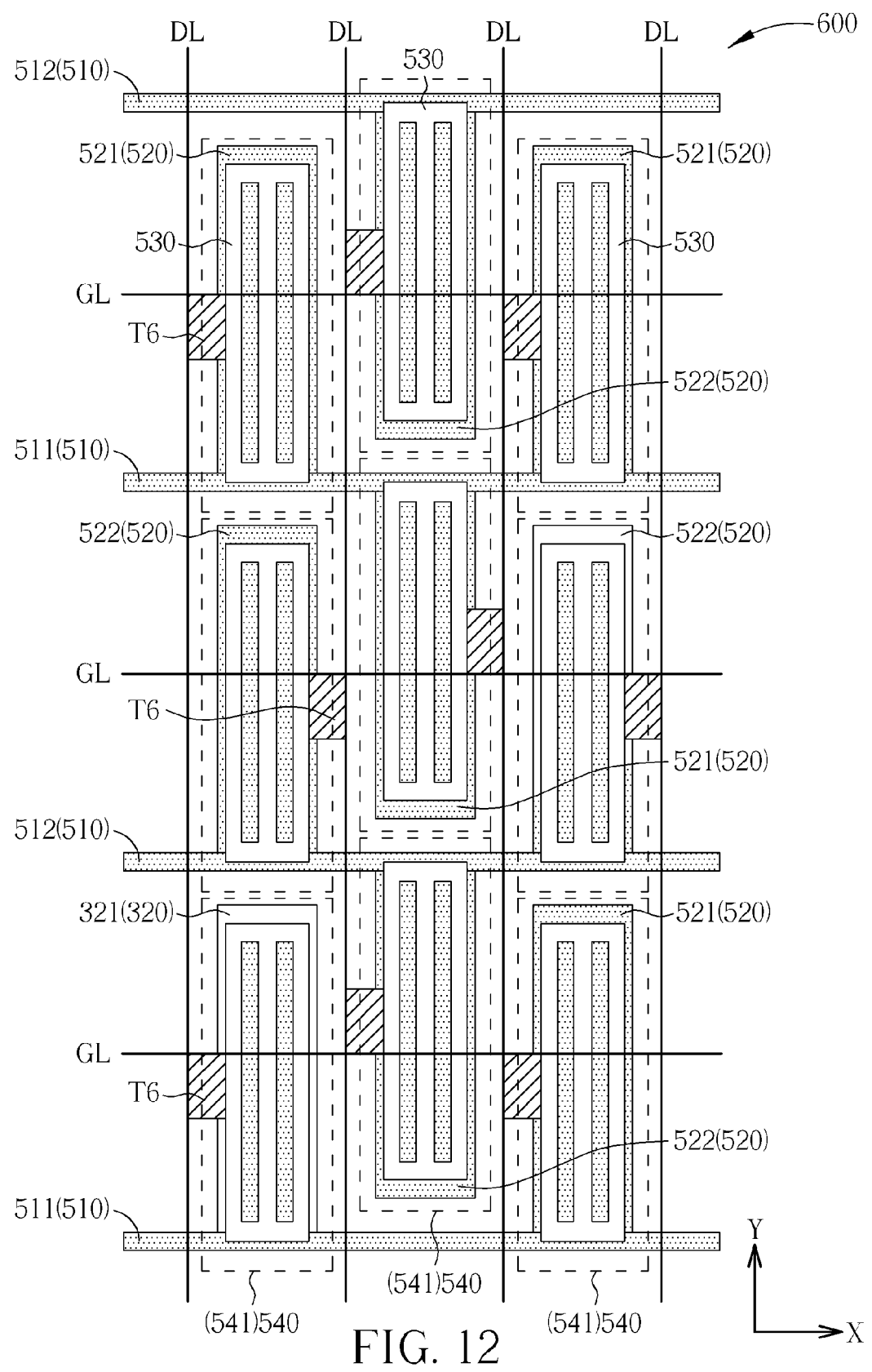
FIG. 12 is a schematic diagram illustrating a pixel array of a fringe field switching liquid crystal display panel according to a sixth embodiment.

Please refer to FIG. 12. FIG. 12 is a schematic diagram illustrating a pixel array of a fringe field switching liquid crystal display panel according to a sixth embodiment. As shown in FIG. 12, in this embodiment, a pixel array 600 of a fringe field switching liquid crystal display panel is provided. The difference between the pixel array 600 in this embodiment and the pixel array 500 in the fifth embodiment is that, in the pixel array 600, two pixel electrodes 530 disposed in the two adjacent sub-pixel regions 541 in an identical column are electrically connected respectively to different data lines DL. Additionally, the pixel array 600 in this embodiment may further include a plurality of switching devices T6 disposed correspondingly to each of the sub-pixel regions 541. Each of the switching devices T6 is electrically connected to the gate lines GL, the data lines DL, and the pixel electrodes 530. Each of the pixel electrodes 530 may be controlled by providing signals to each of the corresponding switching devices T6 via the gate lines GL and the data lines DL. The two adjacent switching devices T6, which are electrically connected to an identical gate line GL, are electrically connected to the two adjacent pixel electrodes 530 in an identical row. The two adjacent switching devices T6, which are electrically connected to an identical data line DL, are electrically connected to the two adjacent pixel electrodes 530 in different columns. In other words, the pixel electrodes 530 in two adjacent sub-pixel regions 541 located in an identical row are electrically connected to an identical gate line GL through the switching device T6. The pixel electrodes 530 in the sub-pixel regions 541 located in an identical column are electrically connected to different data lines DL respectively through one switching device T6. In addition, each the common lines 510 is a straight line in this embodiment, and the common lines 510 may be made of metal conductive materials with low electrical resistance so as to enhance the electrical properties of the pixel array 600 with minor influence on the aperture ratio. Apart from the switching devices T6 and the allocation of the corresponding pixel electrodes 530 in the pixel array 600, the properties of other components and the allocations of other components are similar to those of the pixel array 500 in the fifth embodiment detailed above and will not be redundantly described.

Based on the design of allocation described above, the pixel electrodes 530 connected to the odd data lines DL may correspond with the common electrodes 520 connected to the odd common lines 510, and the pixel electrodes 530 connected to the even data lines DL may correspond with the common electrodes 520 connected to the even common lines 510. The designs of the driving signals via the data lines DL and the common lines 510 may then become more simplified. Therefore, in the pixel array 600 of this embodiment, the common lines 510, which are electrically isolated from each other, may be employed to provide different common signals, the different common signals from the odd common lines 510 and the even common lines 510 may cooperate with the different data signals from the odd data lines DL and the even data lines DL, and the structure of the pixel array 600 may be employed to coordinate the common signals and the data signals. Therefore, the data signals may be provided by a column inversion driving approach to generate a dot inversion driving effect in the pixel array 600 of the fringe field switching liquid crystal display panel. The driving method of the pixel array 600 in this embodiment is similar to the driving method of the second embodiment and will not be redundantly described. It is worth noting that each of the gate lines GL in this embodiment is disposed to penetrate through the sub-pixel regions 541 in an identical row, and the switching devices T6 connected to an identical gate line GL may be disposed on the same side or on different sides of the gate line GL according to different design considerations.

Figure 13:
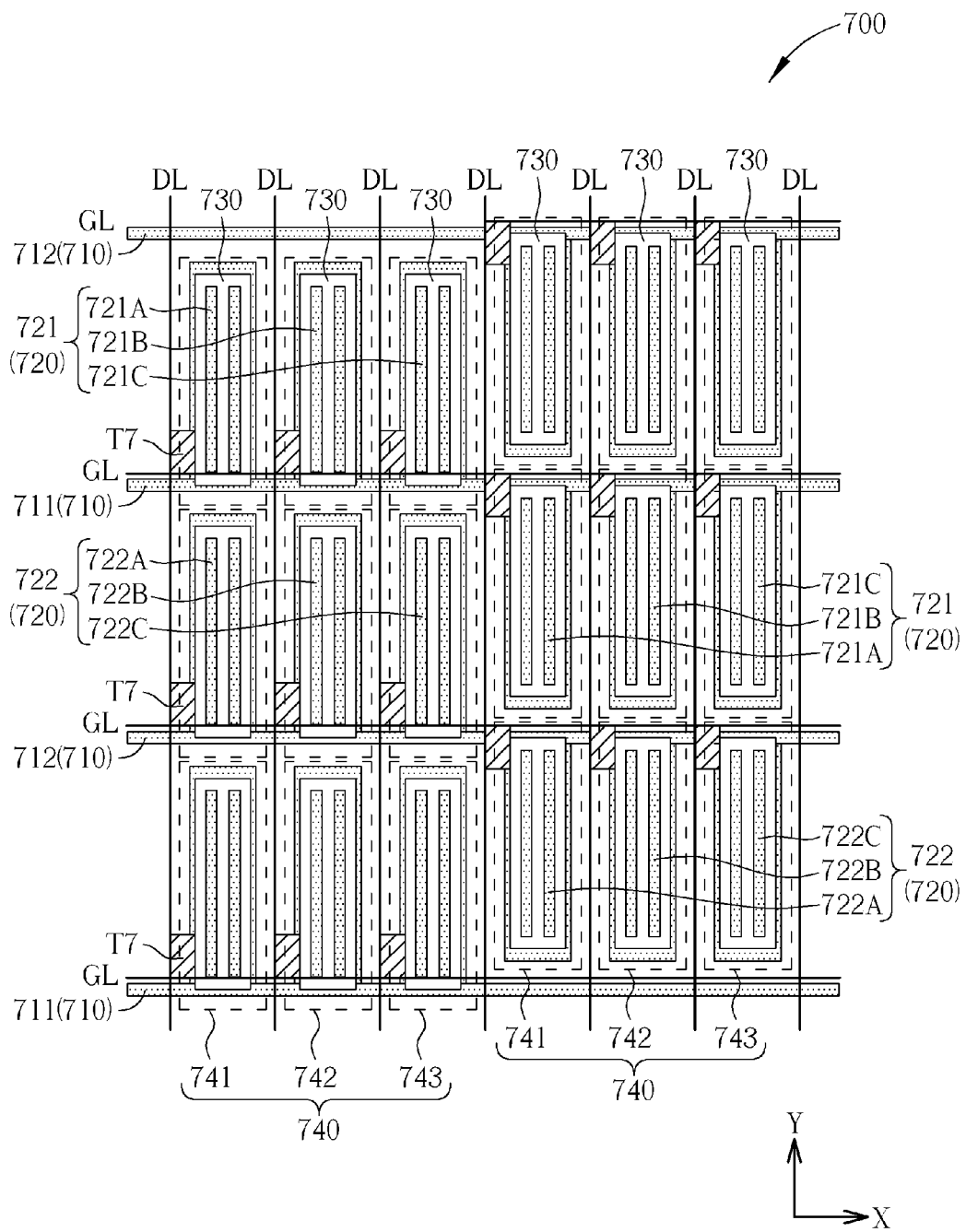
FIG. 13 is a schematic diagram illustrating a pixel array of a fringe field switching liquid crystal display panel according to a seventh embodiment.

Please refer to FIG. 13. FIG. 13 is a schematic diagram illustrating a pixel array of a fringe field switching liquid crystal display panel according to a seventh embodiment. As shown in FIG. 13, in this embodiment, a pixel array 700 of a fringe field switching liquid crystal display panel is provided. The pixel array 700 includes a plurality of gate lines GL, a plurality of data lines DL, a plurality of pixel electrodes 730, a plurality of common lines 710, and a plurality of pixel units 740. The pixel units 7540 are aligned in an array configuration. Two adjacent pixel units 740 located in an identical row are disposed and shifted relatively along the second direction Y. The common lines 710 are disposed substantially along the first direction X and electrically isolated from each other. Each of the common lines 710 includes a plurality of common electrodes 720 extending along the second direction Y. The two adjacent common electrodes 720 of each common line 710 are respectively disposed in the two adjacent pixel units 740 located in different rows. The difference between the pixel array 700 in this embodiment and the pixel array 500 in the fifth embodiment is that each of the pixel units 740 in this embodiment preferably includes a plurality of sub-pixel regions, and the each of the common electrodes 720 preferably includes a plurality of sub common electrodes respectively disposed in each of the corresponding sub-pixel regions. For example, each of the pixel units 740 may include one sub-pixel region 741, one sub-pixel region 742, and one sub-pixel region 743 disposed adjacently along the first direction X, but not limited thereto. The common lines 710 may include a first common line 711 and a second common line 712. The first common line 711 includes a plurality of first common electrodes 721 disposed respectively in the pixel units 740 located in all odd columns of a corresponding odd row and the pixel unit 740 located in all even columns of a corresponding even row. The second common line 712 includes a plurality of second common electrodes 722 disposed respectively in the pixel units 740 located in all odd columns of a corresponding even row and the pixel units 740 located in all even columns of a corresponding odd row. In this embodiment, a pixel unit 740 located in an odd column may be defined as one sub-pixel region 742 located in an even column along with two adjacent sub-pixel regions (one sub-pixel region 741 and one sub-pixel region 743), and a pixel unit 740 located in an even column may be defined as one sub-pixel region 742 located in an odd column along with two adjacent sub-pixel regions (one sub-pixel region 741 and one sub-pixel region 743), but not limited thereto.

The first common electrode 721 may include one sub common electrode 721A, one sub common electrode 721B, and one sub common electrode 721C respectively disposed correspondingly in the sub-pixel region 741, the sub-pixel region 742, and the sub-pixel region 743. The second common electrode 722 may include one sub common electrode 722A, one sub common electrode 722B, and one sub common electrode 722C respectively disposed correspondingly in the sub-pixel region 741, the sub-pixel region 742, and the sub-pixel region 743. Additionally, each of the pixel electrodes 730 in this embodiment is respectively disposed in each of the sub-pixel regions 741, each of the sub-pixel regions 742, and each of the sub-pixel regions 743. The pixel array 700 may further include a plurality of switching devices T7 respectively disposed correspondingly to each of the sub-pixel regions 741, each of the sub-pixel regions 742, and each of the sub-pixel regions 743. Each of the switching devices T7 is electrically connected to the gate lines GL, the data lines DL, and the pixel electrodes 730. Each of the pixel electrodes 730 may be controlled by providing signals to each of the corresponding switching devices T7 via the gate lines GL and the data lines DL. Based on the design of allocation described above, the pixel electrodes 730 connected to the gate line GL may correspond with the common electrodes 720 of the common line 710 adjacent to the gate line GL, and designs of driving signals via the gate lines GL and the common lines 710 may then become more simplified. The driving method of the pixel array 700 in this embodiment is similar to the driving method of the third embodiment detail above and will not be redundantly described.

Figure 14:
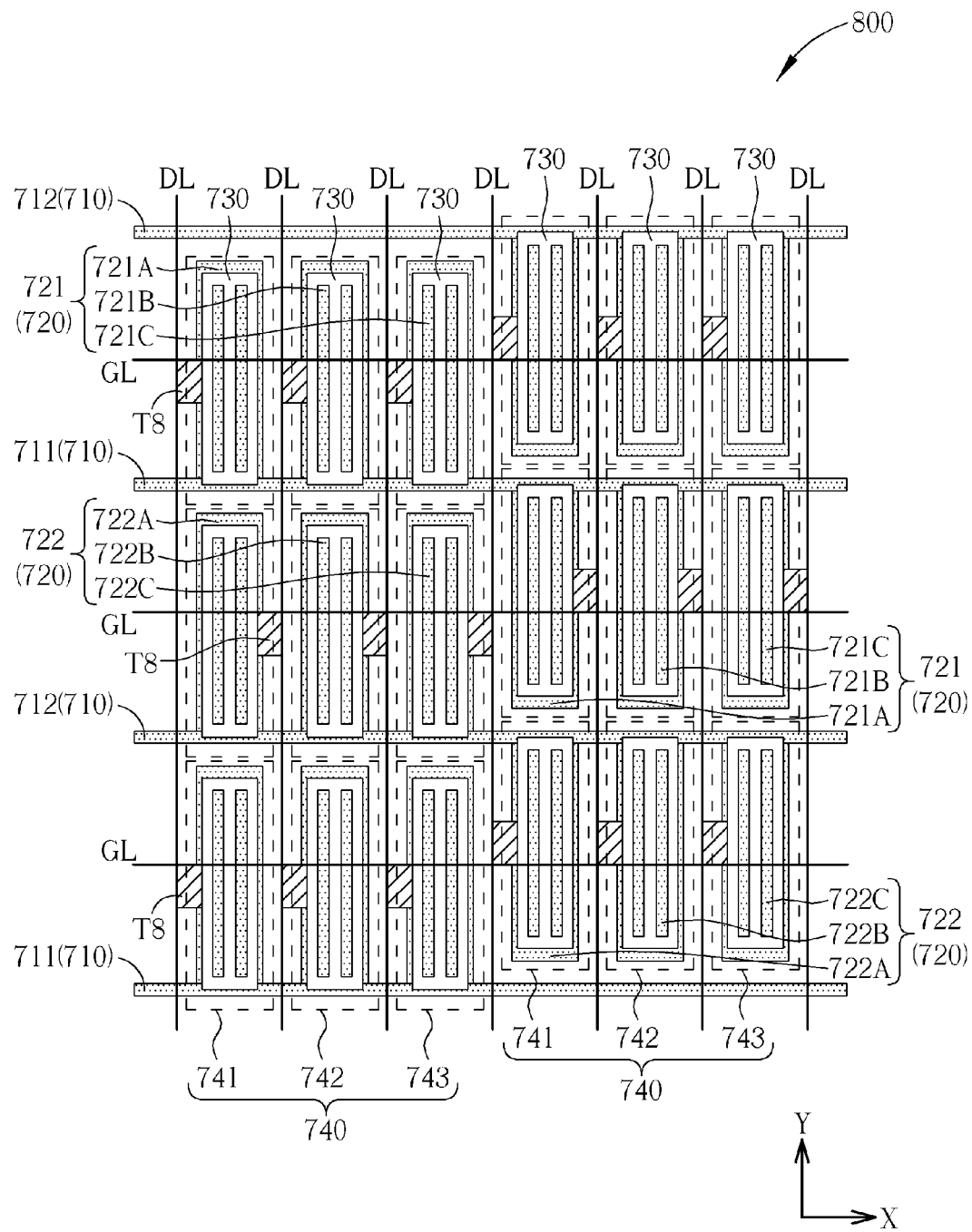
FIG. 14 is a schematic diagram illustrating a pixel array of a fringe field switching liquid crystal display panel according to an eighth embodiment.

Please refer to FIG. 14. FIG. 14 is a schematic diagram illustrating a pixel array of a fringe field switching liquid crystal display panel according to an eighth embodiment. As shown in FIG. 14, in this embodiment, a pixel array 800 of a fringe field switching liquid crystal display panel is provided. The difference between the pixel array 800 in this embodiment and the pixel array 700 in the seventh embodiment is that, in the pixel array 800, two pixel electrodes 730 disposed in the two adjacent sub-pixel regions 741 in an identical column are electrically connected respectively to different data lines DL. Additionally, the pixel array 800 in this embodiment may further include a plurality of switching devices T8 disposed correspondingly to each of the sub-pixel regions 741. Each of the switching devices T8 is electrically connected to the gate lines GL, the data lines DL, and the pixel electrodes 730. Each of the pixel electrodes 730 may be controlled by providing signals to each of the corresponding switching devices T8 via the gate lines GL and the data lines DL. The two adjacent switching devices T8, which are electrically connected to an identical gate line GL, are electrically connected to the two adjacent pixel electrodes 730 in an identical row. The two adjacent switching devices T8, which are electrically connected to an identical data line DL, are electrically connected to the two adjacent pixel electrodes 730 in different columns. In other words, the pixel electrodes 730 in two adjacent sub-pixel regions 741 located in an identical row are electrically connected to an identical gate line GL through the switching device T8. The pixel electrodes 730 in the sub-pixel regions 741 located in an identical column are electrically connected to different data lines DL respectively through one switching device T8.

In addition, each common line 710 is a straight line in this embodiment, and the common lines 710 may be made of metal conductive materials with low electrical resistance so as to enhance the electrical properties of the pixel array 800 with minor influence on the aperture ratio. Apart from the switching devices T8 and the allocation of the corresponding pixel electrodes 730 in the pixel array 800, the properties of other components and the allocations of other components are similar to those of the pixel array 700 in the seventh embodiment detailed above and will not be redundantly described. Additionally, the driving method of the pixel array 800 in this embodiment is similar to the driving method of the fourth embodiment detail above and will not be redundantly described. It is worth noting that each of the gate lines GL in this embodiment is disposed to pass through the sub-pixel regions 741 in an identical row, and the switching devices T8 connected to an identical gate line GL may be disposed on the same side or on different sides of the gate line GL according to different design considerations.

To summarize the above descriptions, in the pixel array of the fringe field switching liquid crystal display panel, the common lines, which may be driven independently, are employed with the interlace allocation approaches of the common electrodes in the adjacent sub-pixel regions for presenting a dot inversion driving effect by a simplified driving method. The power consumption of the fringe field switching liquid crystal display panel may then be improved. The limitation of the required specifications of the driving ICs may be eliminated, and the purpose of lowering the manufacturing cost may then be achieved. Additionally, the allocations of the sub-pixel regions may be further modified to lower the influence of common lines on the aperture ratio. The display quality may accordingly be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel array of a fringe field switching liquid crystal display panel, comprising:
    a plurality of gate lines, disposed parallel to each other substantially along a first direction;
    a plurality of data lines, disposed parallel to each other substantially along a second direction;
    a plurality of pixel units, aligned in an array configuration, wherein each of the pixel units comprises at least one sub-pixel region, and two adjacent pixel units located in an identical row are disposed and shifted relatively along the second direction;
    a plurality of pixel electrodes, respectively disposed in each of the sub-pixel regions, wherein the two pixel electrodes disposed in the two adjacent sub-pixel regions in an identical column are respectively electrically connected to different data lines; and
    a plurality of common lines, disposed substantially along the first direction and electrically isolated from each other, wherein each of the common lines includes a plurality of common electrodes extending along the second direction, and the two adjacent common electrodes of each common line are respectively disposed in the two adjacent pixel units located in different rows.

2. The pixel array of a fringe field switching liquid crystal display panel of claim 1, wherein the common lines include a plurality of first common lines and a plurality of second common lines, each of the first common lines includes a plurality of first common electrodes disposed respectively in the pixel units located in all odd columns of a corresponding odd row and the pixel units located in all even columns of a corresponding even row, and each of the second common lines includes a plurality of second common electrodes disposed respectively in the pixel units located in all odd columns of a corresponding even row and the pixel units located in all even columns of a corresponding odd row.

3. The pixel array of a fringe field switching liquid crystal display panel of claim 1, wherein each of the common lines is a straight line.

4. The pixel array of a fringe field switching liquid crystal display panel of claim 1, wherein each of the pixel units comprises one sub-pixel region, and the two adjacent common electrodes of each common line are respectively disposed in the two adjacent sub-pixel regions located in different rows.

5. The pixel array of a fringe field switching liquid crystal display panel of claim 1, wherein the two pixel electrodes disposed in the two adjacent sub-pixel regions in an identical row are electrically connected to an identical gate line.

6. The pixel array of a fringe field switching liquid crystal display panel of claim 1, wherein each of the pixel units comprises a plurality of sub-pixel regions, each of the common electrodes comprises a plurality of sub common electrodes respectively disposed in each of the corresponding sub-pixel regions.

7. The pixel array of a fringe field switching liquid crystal display panel of claim 1, wherein each of the common lines includes a metal conductive material

* * * * *